March 21, 1961  H. S. HEMSTREET  2,975,671
MEANS FOR ALTERING APPARENT PERSPECTIVE OF IMAGES
Filed May 27, 1955  5 Sheets-Sheet 1

HAROLD S. HEMSTREET
INVENTOR

BY Richard G. Stephens
ATTORNEY

March 21, 1961  H. S. HEMSTREET  2,975,671
MEANS FOR ALTERING APPARENT PERSPECTIVE OF IMAGES
Filed May 27, 1955  5 Sheets-Sheet 2

HAROLD S. HEMSTREET
INVENTOR

BY Richard H. Stephens
ATTORNEY

FIG. 5

HAROLD S. HEMSTREET,
INVENTOR

BY Richard G. Stephens
ATTORNEY

FIG. 6

HAROLD S. HEMSTREET
INVENTOR

United States Patent Office 2,975,671
Patented Mar. 21, 1961

2,975,671
MEANS FOR ALTERING APPARENT PERSPECTIVE OF IMAGES

Harold S. Hemstreet, Binghamton, N.Y., assignor to General Precision, Inc., a corporation of Delaware Filed May 27, 1955, Ser. No. 511,488

10 Claims. (Cl. 88—24)

This invention relates to apparatus for altering the apparent perspective of images. In my copending applications Serial Number 480,033 filed January 5, 1955 for "Visual Display Method and Apparatus" and Serial Number 500,325 filed April 11, 1955 for "Simulated Viewpoint Displacement Method and Apparatus" there are shown methods and means by which an image having the appearance of an area as viewed from a particular viewpoint may be "distorted" or altered in apparent perspective so as to provide an image having the appearance of said area as viewed from a different viewpoint displaced laterally and/or vertically in the plane of the particular viewpoint. Application Serial Number 480,033 illustrates apparatus comprising a rotatable prism and a variable power anamorphoser, the prism being operable to provide "distortion" of the type required to simulate lateral displacement of the viewpoint, and the anamorphoser being operable to provide "distortion" of the type required to simulate vertical displacement of the viewpoint. Application Serial Number 500,325 illustrates improved apparatus for providing the same effect, said improved apparatus comprising in one preferred embodiment a pair of variable power anamorphosers rotatable as a unit about a projection system axis. Using either of the abovementioned systems, objects having the appearance of areas as viewed from given viewpoints may be distorted to provide images simulating the same areas as viewed from different viewpoints. Each of the abovementioned applications shows in considerable detail the inventions as they may be used in conjunction with grounded flight trainers or simulators to provide a realistic visual display of simulated aircraft travel. Motion picture films of a grounded area may be taken from an actual aircraft as it travels with respect to said area along a "reference" path, or motion pictures may be taken while moving a camera along a miniature reference path in relation to a model ground scene. If such films are then projected upon a screen for observation by a person within a grounded trainer, and if the images of such films are suitably altered in apparent perspective in accordance with the difference between the reference path and the simulated course "flown" by the grounded trainer, an extremely realistic visual display may be obtained, and such display is of great value in the instruction of aircraft pilots.

The present invention relates to an improvement to the apparatus disclosed in application Serial Number 500,325, which uses in a preferred embodiment two variable power anamorphosers. As far as I know, variable power anamorphosers are not utilized extensively in much apparatus other than that described above, and hence such optical devices are not always readily available on the market and often must be specially constructed, sometimes at considerable expense. The present invention contemplates in some embodiments use of only a single variable power anamorphoser together with other optical means readily constructed or more available on the market, and hence provides a more economical method and means by which the aforementioned alteration of the apparent perspective of images may be accomplished.

It is therefore an object of the invention to provide improved apparatus for providing alteration of the apparent perspective of optical images.

It is a further object of the invention to provide improved apparatus for providing alteration of the apparent perspective of an image which requires the use of a single variable power anamorphoser in conjunction with a conventional variable effective focal length spherical lens.

It is another object of the invention to provide improved electrical means for altering the apparent perspective of images.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

Fig. 1a is a plan view of a grounded object comprising square with an inscribed circle.

Fig. 1b is an elevation view showing geometrically the views seen at different altitudes of the grounded object of Fig. 1a;

Figures 1A, 1B:
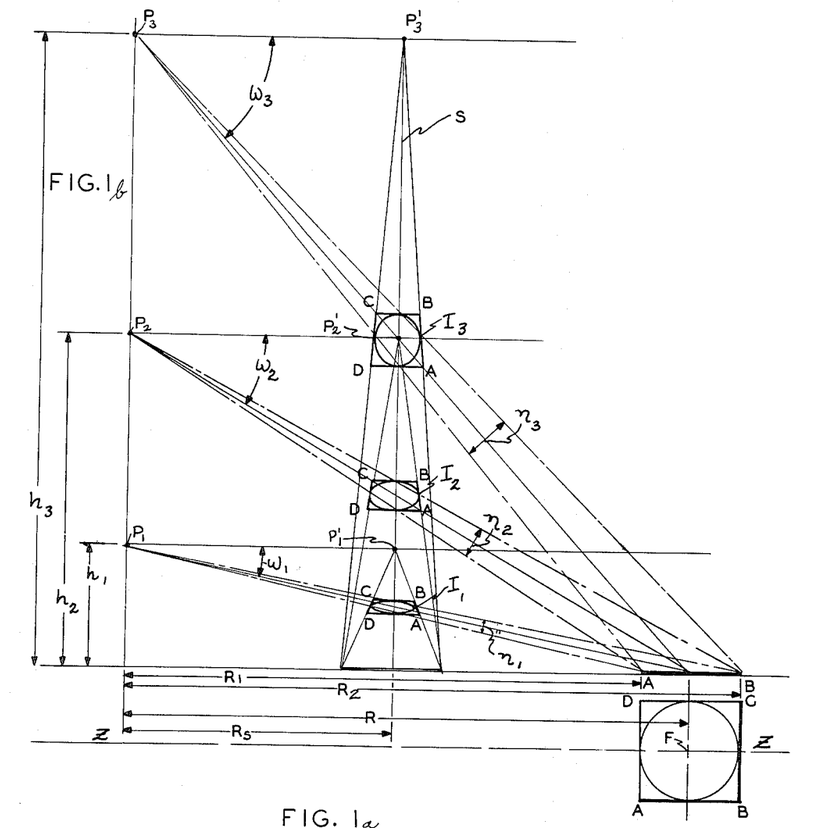

Assume that a large grounded surface area carries a square ABCD with an inscribd circle J, such as shown in a plan view in Fig. 1a. If such figures are viewed from any point directly above their common center (i.e. from any point on a line perpendicular in two directions from the plane of the figures), the figures will appear "undistorted," or in other words, the viewer will perceive a square and a circle. If such figures are viewed from any other point (i.e., at some point angle than directly above, the viewer will perceive an ellipse and a trapezoid rather than a circle and a square. In the elevation view of Fig. 1b, the figures lie on the ground between points A and B and are observed from three viewpoints, $P_1$, $P_2$ and $P_3$, each of which viewpoints are situated at different altitudes above the ground but each at the same distance R (see Fig. 1a) from the center of the figures. It will be seen that if an observer is located at viewpoint $P_1$ at an altitude $h_1$ above the ground, that the dimension of the figure along axis Z—Z will subtend an angle $\eta_1$ at the eye of the observer, and that the line of sight (line $P_1F$) from the observer to the center of the figures will make an angle $\omega_1$ with a horizontal line $P_1P'_1$ drawn through viewpoint $P_1$. Similarly, the same dimension of the figures will subtend angles $\eta_2$ and $\eta_3$ at the eye of the observer when the figures are viewed from viewpoint $P_2$ (at altitude $h_2$) and viewpoint $P_3$ (at altitude $h_3$), and the angles downward from the horizon at which the observer views the figures will be $\omega_2$ and $\omega_3$, respectively. Now assume that a large screen S is interposed between the viewpoints and the figures observed. It will be seen that if proper images of the grounded figures were present on screen S, that an observer would perceive the same scenes as formerly observed on the ground. Shown in Fig. 1b are images $I_1$, $I_2$ and $I_3$, which indicate the proper location, size and shape of the images required on screen S, the images having been rotated 90 degrees about the vertical. It should now become apparent that if suitable images are projected upon a screen for observation by a stationary observer (such as a student in a stationary grounded trainer, for example) that scenes such as those viewed at various altitudes may be presented to the stationary observer, providing the observer with an illusion of apparent location at the various altitudes. For example, if image $I_3$ is projected onto a screen at an angle $\omega_3$ downward from a horizontal line drawn through the stationary viewpoint so that it subtends an angle $\eta_3$ at the eye of the stationary observer, there will be created an illusion to the observer of seeing the actual figures from viewpoint $P_3$ at an altitude $h_3$, or if an image such as $I_2$ is projected at an angle $\omega_2$ downwardly from the horizontal line drawn through the observer's stationary viewpoint so that it subtends an angle $\eta_2$ at the eye of the stationary observer, he will have the illusion of viewing the grounded image from viewpoint $P_2$ at an altitude $h_2$.

Any rectangular grounded surface viewed in perspective appears trapezoidal, or otherwise stated, any pair of lines actually parallel appear to converge at a vanishing point when viewed in perspective. For example, a flat roadway of great length having actually parallel sides appears in perspective to converge to a point at the horizon. In Fig. 1b images $I_1$, $I_2$ and $I_3$ are drawn so that sides AB and CD of each of the images converge at the horizon points $P_1'$, $P_2'$ and $P_3'$ associated with the altitudes of their respective viewpoints. Since figure ABCD is actually a square (DA=AB) determination of the points at which lines connecting the various viewpoints with parts of square ABCD intersect screen S also determines the width of lines DA and CB of each of images $I_1$, $I_2$ and $I_3$. It may be noted that the trapezoids of images $I_1$, $I_2$ and $I_3$ have upper and lower bases of equal respective width, indicating that an image of a square or other grounded object cast for observation on a screen by a stationary observer should not change in width as the image is changed in size, shape and location to simulate vertical movement of the observer to a different altitude, but that only the height of such image should change. From Fig. 1b the height of image $I_1$ may be determined as follows. The distance from point $P_1'$ to the top of image $I_1$ may be seen by similar triangles to equal $$h_1\left(\frac{R_s}{R_2}\right)$$

The distance from point $P_1'$ to the bottom of image $I_1$ may be seen by similar triangles to equal $$h_1\left(\frac{R_s}{R_1}\right)$$

Thus the height of image $I_1$ may be expressed as:

$$\text{height } I_1 = h_1\left(\frac{R_s}{R_1} - \frac{R_s}{R_2}\right) = h_1 R_s\left(\frac{1}{R_1} - \frac{1}{R_2}\right) \quad (1)$$

By similar analysis the height of image $I_2$ may be expressed similarly as:

$$\text{height } I_2 = h_2 R_s\left(\frac{1}{R_1} - \frac{1}{R_2}\right) \quad (2)$$

Thus the required change in height $\Delta \eta$ of an image of an object to simulate a change in altitude may be expressed as the difference between equations (1) and (2), or:

$$\Delta_\eta = (h_2 - h_1) R_s\left(\frac{1}{R_1} - \frac{1}{R_2}\right) \quad (3)$$

Since distances $R_s$, $R_1$ and $R_2$ are constants for a change in altitude only, with the distance from the stationary viewpoint to the screen fixed, it will be seen that the required change in height of the projected image for simulated change in altitude is a function of altitude change only.

As has been shown in Fig. 1b, the location on the screen of an image of an object must change as altitude changes in order to simulate properly the object as seen at a different altitude. Image $I_1$ must be projected downwardly at an angle $\omega_1$ from a horizontal line through the stationary observer's viewpoint, and hence it will be seen by similar triangles that the center of image $I_1$ will lie on screen S below the horizon line a distance of $$h_1\frac{R_s}{R}$$

By similar analysis the distance of the center of image $I_2$ below the horizon line on screen S will be found to be expressable as $$h_2\frac{R_s}{R}$$

Hence as simulated altitude increases, the distance of any point of an image from the horizon line on the screen must vary inversely in accordance with its distance from the horizon. The proper alteration of an image then, to provide an apparent change in altitude, is a compressing or stretching of the image with respect to the observed horizon line.

Figure 2:
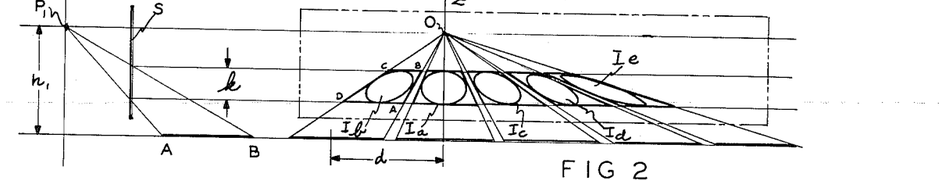
Fig. 2 is a geometrical diagram showing in its left hand portion an elevation view of a viewpoint at a particular altitude and in its right hand portion the views seen at such altitude at five different lateral positions.

To simulate observation from point $P_1$ an altitude $h_1$ above the ground of the grounded object of Fig. 1 (the side of which is shown as line AB in Fig. 2), an image having a height $k$ and location as shown should be cast upon screen S, as is shown in the left-hand portion of Fig. 2. The right hand portion of Fig. 2 illustrates the proper images which should be projected on screen S to simulate displacement of the viewpoint at five different positions displaced in a horizontal direction parallel to screen S. Image $I_a$ illustrates the image required to create the illusion of seeing the grounded object from altitude $h_1$ at a point directly above the centerline Z—Z of the object, and it will be seen that image $I_a$ is symmetrical about line Z—Z. Image $I_b$ illustrates the image required to create the illusion of seeing the grounded object from altitude $h_1$ at a point displaced laterally a distance $d$ to the right of centerline Z—Z, and images $I_c$, $I_d$ and $I_e$ illustrate the images required to create the illusion of seeing the grounded object from three different points laterally displaced different distances to the left of centerline Z—Z.

Consider the differences between images $I_a$ and $I_b$, and assume that an image such as $I_a$ is projected upon the screen from a slide or one frame of a motion picture film. It will become apparent that if such a projected image could be altered or distorted to provide instead an image such as $I_b$, that a stationary observer viewing the screen would receive the illusion of having moved to the right through distance $d$. It may be noted that any point on the horizon from altitude $h_1$ should remain at point O regardless of lateral position from which the grounded object is supposed to be viewed. It may also be noted that the distance of any point on image $I_a$ to a corresponding point on image I_b is directly proportional to the simulated viewpoint displacement distance $d$, and inversely proportional to the distance of such point from the horizon. Such distortion or alteration of the apparent perspective of an image to provide an image having the appearance of being viewed from a laterally displaced viewpoint is termed "shear" distortion, since it is analogous to the distortion produced by applying pure shear forces to an elastic member.

Thus it may be seen that by providing distortions of the types explained above in connection with Figures 1 and 2 that both vertical and lateral displacement of a viewpoint may be simulated. My copending application Serial Number 480,033 illustrates in a preferred embodiment a variable anamorphoser and a rotatable prism which independently produce vertical and shear distortion of the required nature, and copending application Serial Number 500,325 illustrates in a preferred embodiment a pair of crossed variable anamorphosers which cooperatively produce the desired change in apparent perspective of an image.

Figure 3A:
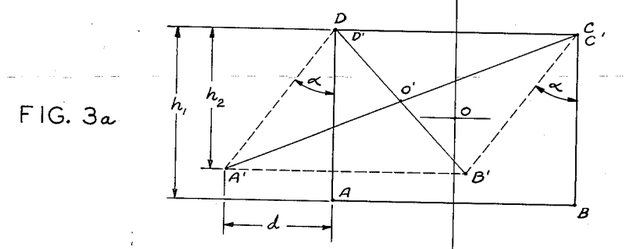
Figs. 3a and 3b are geometrical diagrams useful in understanding how a variable anamorphoser and a variable power spherical lens may be utilized to provide alteration of the apparent perspective of images.

Referring to Fig. 3a there is shown a rectangle ABCD having a height $h_1$. Assume that the rectangle outlines a portion of an image representing a scene viewed at an altitude $h_1$ from a viewpoint located on the centerline of the rectangle. Recalling the above analysis from Figs. 1 and 2 it will be seen that the parallelogram of Fig. 3a may represent the same image portion viewed from an altitude $h_2$ at a viewpoint displaced laterally a distance $d$ from the original viewpoint associated with the rectangle. Assuming that the upper line of the rectangle (also the upper line of the parallelogram) represents the horizon or vanishing point portion of the image, it will be seen that the parallelogram of Fig. 3a may be formed by (1) stretching the rectangle with respect to the horizon line in accordance with the change in altitude between the viewpoints, and (2) by shearing the image in an amount proportional to lateral distance between the viewpoints, while maintaining the horizon portion of the image in its original form.

Figure 3B:
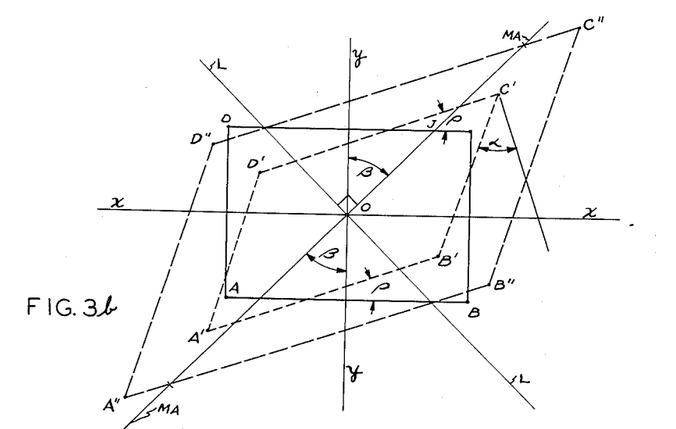

In Fig. 3b there is shown rectangle ABCD representing an image having the appearance of an area as viewed from an original altitude from a reference lateral position. Also shown is a parallelogram A'B'C'D' corresponding to the parallelogram of Fig. 3a, but the parallelogram of Fig. 3b has been rotated through an angle $\rho$ with respect to the rectangle. The operation of the invention is to receive an image such as that represented by the rectangle of Fig. 3b and to stretch or compress and shear the image to provide an image such as is represented by the parallelogram A'B'C'D' of Fig. 3b. The altered image may then be rotated and shifted, if desired, so that the vanishing point or horizon portion of the image will be located in its original position. The further rotation and shifting will ordinarily be desirable when the invention is used to provide simulation of continuous displacement of the viewpoint.

Assume that the image represented by rectangle ABCD is projected along an optical axis having its center at O. Also assume that direction X—X and direction Y—Y of Fig. 3b are respectively the horizontal and vertical axes of the image. If an anamorphoser is inserted in the optical system, the rectangle image will be magnified more along one axis than along a second perpendicular axis. For example, if an anamorphoser were used which had a power greater than unity along axis Y—Y and a power of unity along axis X—X, the rectangle would be increased in height. If an anamorphoser is inserted so that its axes of magnification do not correspond to the horizontal and vertical axes of the image, the image will be sheared. Assume that an anamorphoser is inserted in the optical system to operate upon the image of rectangle ABCD with the greater than unity power of the anamorphoser acting along axis MA and with a unity power along axis L—L perpendicular to axis MA. Axis MA is shown in Fig. 3b rotated through an angle $\beta$ from vertical axis Y—Y of the original image. Dimensions of the original rectangle image along axis MA will then be increased, while dimensions of the original image along axis L—L will remain the same, resulting in a parallelogram image. In Fig. 3b if the power of the anamorphoser along axis MA is assumed to be 2, the image produced by the anamorphoser will correspond to large parallelogram A"B"C"D", wherein dimensions along axis MA are double the corresponding dimensions of the rectangle, and dimensions along axis L—L of both figures are the same. The expansion or magnification of a geometrical figure along a single axis is known mathematically as a "primitive transformation." Hence an anamorphoser may be seen to be a means for providing a primitive transformation of an image. As will be shown hereinafter, one may utilize either an optical anamorphic lens as a means for providing a primitive transformation, or alternatively, an electrical means which will be described with relation to Fig. 7.

Now assume that a spherical lens is inserted into the optical system to operate upon the distorted image represented by large parallelogram A"B"C"D". The spherical lens may be made to image the parallelogram image upon a screen or other surface. If the focal length or magnification of such a spherical lens is properly selected, the resultant image cast upon the screen may be made to correspond with parallelogram A'B'C'D' of Fig. 3b, since it will be apparent that parallelogram A'B'C'D' is merely a reduced copy of parallelogram A"B"C"D". In order for resultant image A'B'C'D' to represent the original image as viewed from a different viewpoint in the manner discussed above, the vanishing line or horizon portions of the original and the altered figures must be the same size. Thus in Fig. 3b, if line CD of the rectangle represents the horizon portion of the projected image, line C'D' of parallelogram A'B'C'D' must be the same length as line CD. Since the length of side C"D" of parallelogram image A"B"C"D" depends upon the length of side CD of the original image, the power of the anamorphoser along axis MA and the angular orientation of the anamorphoser with respect to the original rectangle image (i.e., the value of angle $\beta$) it will be seen that the focal length or magnification required in the spherical lens to provide a resultant image of proper size for focus upon a surface at a fixed distance is a function of the angle $\beta$ and the power $M_a$ of the anamorphosers along axis MA. Therefore, if the spherical lens mentioned above actually comprises a variable effective focal length lens combination, provision of the proper magnification for various values of $\beta$ and $M_a$ will provide an image on the surface or screen bearing the correct size relation. The ordinary magnification of a system using spherical lenses may be termed "spherical magnification" to distinguish it from the primitive transformation caused by an anamorphic lens. As will be explained below, one may utilize either an ordinary optical system or electrical means for providing spherical magnification.

As mentioned above, in systems wherein it is desirable to provide "distortion" to simulate continuous viewpoint displacement it is desirable to maintain the horizon portion of an image fixed on a screen or viewing surface. Since use of the anamorphoser-variable focal length lens combination serves to rotate the image through the angle $\rho$ as shown in Fig. 3b, it is necessary in such systems to provide a counter-rotation. In optical system of relatively small angular field, such as systems utilizing the invention to slant lettering or designs, the necessary counter-rotation may be effected such as by use of Dove prisms, as will be readily apparent to those skilled in the art. In systems requiring a larger angular field, I prefer to provide the counter-rotation by rotating the object and anamorphoser through the angle $\rho$. As well as providing the counter-rotation through the angle $\rho$, it is necessary in some systems to shift the resultant image laterally and/or vertically on the screen or other surface if it is considered desirable to maintain image portions representing the horizon or vanishing line at a fixed location as viewpoint displacement is continuously varied. Such shifting will be required in any such system if the vanishing point or horizon of the original image is not projected along the optical axis of the system. The shifting required is explained in detail in my copending application Serial Number 503,211 filed April 22, 1955 for "Method and Apparatus for Producing Visual Display," and means and method are shown therein which may be used for providing the desired shifting in systems constructed in accordance with the present invention. It will become apparent from comparison of Figs. 3a and 3b that to align horizon line C′D′ of the distorted rectangle with line CD of the original or rectangle image, that in addition to providing counter-rotation $\rho$, that parallelogram A′B′C′D′ must be shifted leftwardly and upwardly. It may also be seen that if the horizon or vanishing line portion of the original image were a horizontal line passing through the optical axis O of the system, that the distortion of the rectangle image by the anamorphoser and variable focal length spherical lens would not displace such portion of the image from the system axis, and hence no shifting of the distorted image would then be necessary. Therefore, if the object utilized was made so that its portion representing the vanishing point is aligned with the system optical axis, or if the object is shifted so that its vanishing point portion is aligned with the system axis, the resultant projected and distorted image will have its vanishing point portion suitably located. Throughout the specification and claims, the word "magnification" is intended to include magnification less than unity power as well as magnification greater than unity power.

Thus it will be seen that an anamorphoser and a spherical lens may be utilized to distort an image so as to alter its apparent perspective, and to cast a projected image upon a screen or other surface. Since the required powers of the anamorphoser and the spherical lens are different for different amounts of viewpoint displacement, I have provided a variable power anamorphoser and a variable effective focal length lens in the invention. The relationship between an undistorted image and a resultant distorted image are discussed in terms of viewpoint displacement in connection with Figs. 1 and 2. The relationships between the undistorted and the distorted images in terms of the powers and orientation of the optical elements are shown geometrically in Figs. 3a and 3b. By analysis of Figs. 3a and 3b, a number of relationships between the distorted and undistorted images may be determined, utilizing three known relationships: (1) the ratio of the heights $h_1$, $h_2$ of the rectangle, (2) the angle of slant $\alpha$, and (3) the fact that the vanishing point or horizon dimension of both figures is the same. By straightforward trigonometry which need not be set forth herein, equations may be written which express various relationships of Figs. 3a and 3b in terms of viewpoint displacement. In order to provide automatic control of the invention from inputs which are functions of viewpoint displacement, equations may be written which express the variables M (power of the anamorphoser), $P_0$ (power of the variable spherical lens), and $\beta$ (the angular orientation of the anamorphoser with respect to the object), or instead functions of such variables in terms of viewpoint displacement. If it is considered desirable to provide the abovementioned counter-rotation to maintain vanishing point positions of the images coincident, an equation containing the counter-rotation angle $\rho$ or a function thereof may be written. The equations may be plotted against vertical and lateral viewpoint displacement to provide charts such as Fig. 4. The equations also may be solved simultaneously by means of interconnected servos in a manner well known in the analogue computer art, but since the dynamic behavior of such simultaneous equation solvers having many interconnecting loops is usually quite difficult to analyze, it is usually deemed preferable to solve the simultaneous equations analytically for the control variables required. The following equations may be derived from Figs. 3a and 3b:

$$m^2 - m\left[\frac{d^2 + h_1^2 + h_2^2}{h_1 h_2}\right] + 1 = 0 \quad (1)$$

or, $$h_1 h_2 m^2 - m(d^2 + h_1^2 + h_2^2) + h_1 h_2 = 0 \quad (1a)$$

$$\tan 2\beta = \frac{-2dh_1}{h_1^2 - h_2^2 - d^2} \quad (2)$$

or, $$\sin 2\beta (h_1^2 - h_2^2 - d^2) = -2dh_1 \cos 2\beta \quad (2a)$$

$$P_0^2 = \frac{h_2}{h_1} \times \frac{1}{m} \quad (3)$$

or, $$h_1 m P_0^2 = h_2 \quad (3a)$$

Expressions 1 and 2 may be seen to recite required control quantities ($m, \beta$) in terms of viewpoint displacement quantities ($d$, $h_1$, $h_2$). The power of the variable focal length spherical lens is expressed in Equation 3 in terms of anamorphoser power $m$ as well as viewpoint displacement since Equation 3 may be mechanized for analogue computer solution somewhat easier than an expression such as (4) for such power in terms of viewpoint displacement quantities only.

$$P_0^2 = \frac{h_2}{h_1} \times \frac{2}{\frac{d^2 + h_1^2 + h_2^2}{h_1 h_2} + \sqrt{\left[\frac{d^2 + h_1^2 + h_2^2}{h_1 h_2}\right]^2 - 4}} \quad (4)$$

The counter-rotation angle $\rho$ may be expressed as follows:

$$\tan \rho = \frac{d}{h_1 + h_2} \quad (5)$$

or, $$d \cos \rho = (h_1 + h_2) \sin \rho \quad (5a)$$

It is to be emphasized that while the above expressions accurately set forth the relationships between the required control variables, and that while such equations are deemed to be in a convenient form for analogue computer solution, that those skilled in the computer art may readily mechanize equivalent expressions, and in certain applications where only limited viewpoint displacement is to be simulated accurately, that various terms in the equations having minor effect over the range of intended operation may be neglected without prohibitive error.

Figure 4:
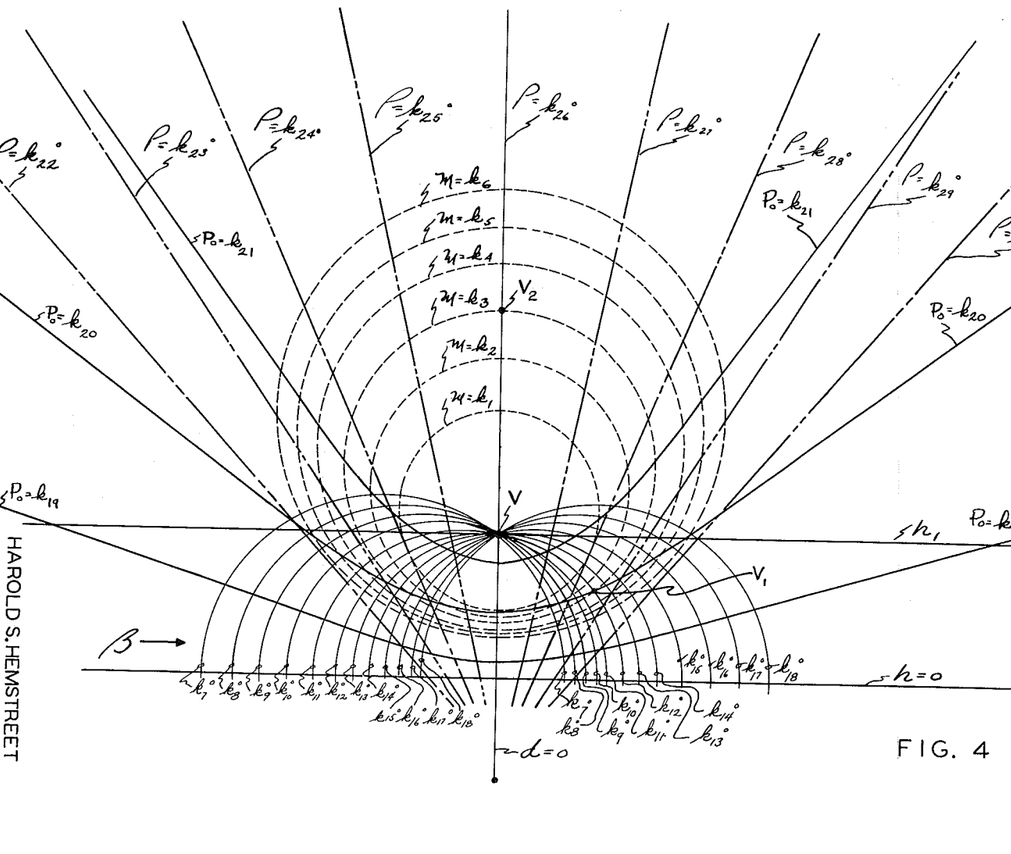
Fig. 4 is a chart showing the relationship between viewpoint displacement and various control quantities which may be applied to apparatus of the invention to provide viewpoint displacement.

Figure 4 illustrates in graphic form the general nature of the relationships between power and orientation of the distortion apparatus and viewpoint displacement. Expression 1 given above for $m$ may be seen to be an expression defining a circle, and in Fig. 4 there are shown six plots of Expression 1 plotted on vertical displacement $h$ and lateral displacement $d$ coordinates in the plane of the object. Inspection of Expression 1 or Fig. 4 indicates that values of consatnt anamorphoser power are circles of varying diameter all having their centers spaced at different points along the $d=0$ axis. Assume that in Fig. 4 the horizontal line labelled $h_1$ indicates the altitude or vertical position from which a film was taken. The various $m$ circles then indicate the required anamorphoser power to simulate displacement of the viewpoint to points corresponding to the respective plotted values. For example, if the viewpoint $V_2$ is to be simulated, an anamorphoser power $m$ equal to $k_3$ is required.

Plots of Expression 2 for twelve various values ($k_7$ degrees through $k_{18}$ degrees) of constant $\beta$ (anamorphoser orientation with respect to the object) yield circles of the type partially shown in Fig. 4, and partial plots of Expression 3 for three values ($k_{19}$ through $k_{21}$) of spherical magnification $P_0$ provide plots as shown. The curves of constant anamorphoser angle $\beta$ may be seen to be circles of varying diameter all having their centers located at various points along the $h=0$ line, with each circle passing through the original viewpoint position V. The curves of constant spherical magnification $P_0$ may be seen to comprise hyperbolas having their centers located at the $d=0$, $h=0$ point. Plots of Expression 5 for various values of $\rho$ may be made, resulting in the straight lines shown for nine different values ($k_{22}$ through $k_{30}$) of counter-rotation angle $\rho$. Assume that an object represents an image as viewed from point V. If it is desired to provide distortion of an image of the object to simulate observation from point $V_1$ located below point V and laterally displaced to the right, inspection of Fig. 4 will reveal that the required anamorphoser $m$ power is approximately $k_3$, the required angular rotation $\beta$ between the anamorphoser and the object is $k_{12}$ degrees, the required value of spherical magnification $P_0$ is approximately equal to $k_{20}$, and the required counter-rotation angle $\rho$ is midway between $\rho=k_{28}$ and $\rho=k_{29}$ degrees. With charts such as that of Fig. 4, the powers and rotations for any desired viewpoint may be determined, and then the apparatus may be manually or automatically positioned to such powers and angles. Dials and scales may be provided in conventional manner on the apparatus of Fig. 7 to facilitate adjustment of the various elements to the desired positions. It should be recognized that the plots shown in Fig. 4 are all partial plots, and complete plots should be provided for determination of required control quantities for more widely varying viewpoints. It should also be remembered that the distances $d$ and $h$ are measured in the plane of the viewpoint.

Figure 5:
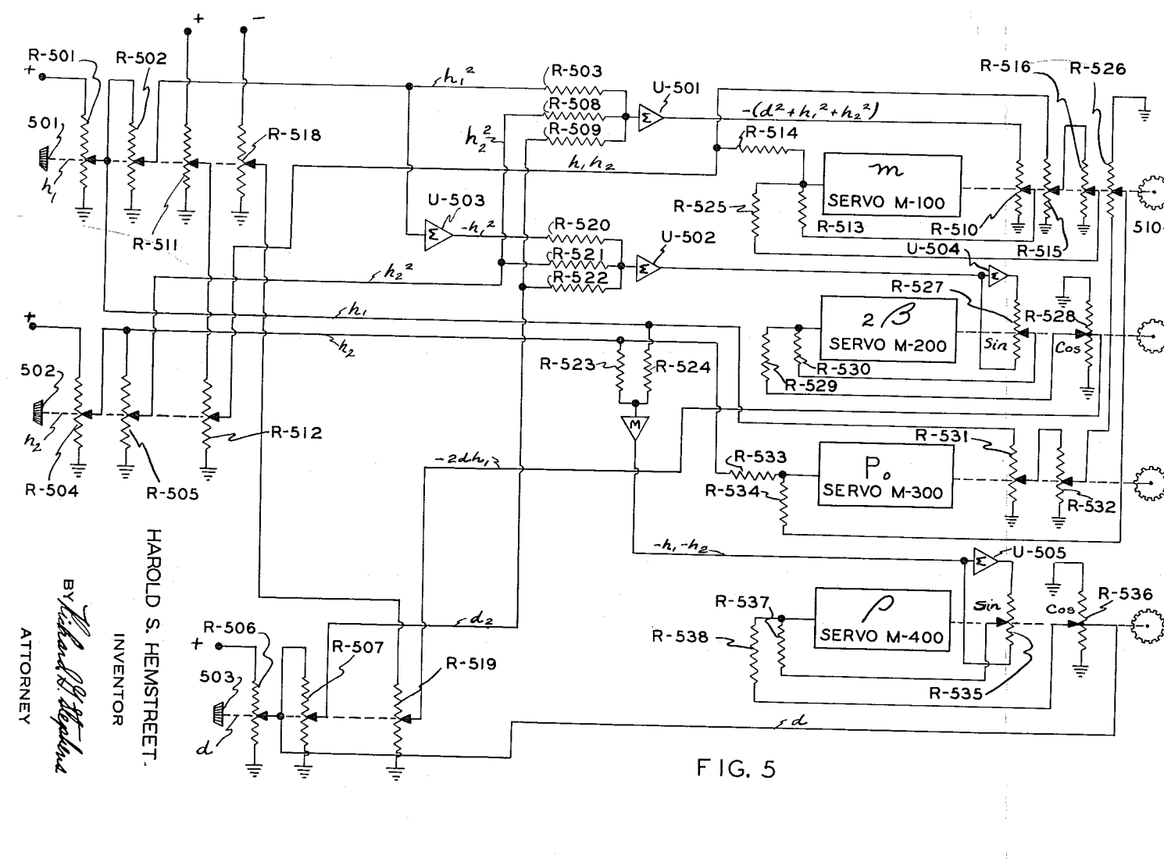
Fig. 5 is an electrical schematic diagram of an exemplary form of analogue computer which may be used to provide semi-automatic control of the apparatus of the invention.

Shown in Fig. 5 in electrical schematic form is an exemplary form of analogue computer which may be utilized to receive input quantities in terms of viewpoint displacement to provide output quantities to control the optical elements of the invention, and those skilled in the art will recognize that the system shown is an analogue computer mechanization of Equations $1a$, $2a$, $3a$ and $5a$. Viewpoint displacement input quantities are shown applied to the computer of Fig. 5 by means of manually-positioned potentiometer control knobs 501, 502 and 503, but those skilled in the art will readily recognize that such inputs may be automatically controlled. Apparatus suitable for providing such inputs automatically when the invention is used in conjunction with a grounded aircraft trainer is shown in both of my co-pending applications Serial Number 480,033 and Serial Number 500,325.

A constant potential excites potentiometer R–501, the arm of which is positioned by the $h_1$ input quantity, applying an $h_1$ potential to excite potentiometer R–502, the arm of which is similarly positioned, thereby providing an $h_1^2$ potential on the arm of potentiometer R–502. This potential is applied via summing resistor R–503 to summing amplifier U–501. In similar manner $h_2^2$ and $d^2$ potentials are derived by cascaded potentiometer pairs R–504, R–505 and R–506, R–507, and these potentials are applied to amplifier U–501 via summing resistors R–508 and R–509, respectively. The sum of such applied potentials, inverted in polarity by amplifier U–501 is applied to excite potentiometer R–510, the arm of which is positioned by $m$ servo M–100, applying a potential commensurate with the second term of Equation $1a$ to the input circuit of servo M–100 via resistor R–513. A potential proportional to $h_1h_2$ is derived by means of potentiometers R–511 and R–512, and applied via summing resistor R–514 to the servo M–100 input circuit. The $h_1h_2$ potential is also applied to excite a cascaded pair of potentiometers R–515 and R–516, the arms of which are positioned by the M–100 servo, deriving a potential proportional to the first term of Expression $1a$. Servo M–100 continuously positions itself so that the sum of the applied input potentials is maintained at zero, thereby solving Equation $1a$ and providing a shaft output position commensurate with $m$, the power of the variable anamorphoser. The shaft output quantity may be connected to position the anamorphoser at the required anamorphic magnification by means of gear 510, as shown in Fig. 6.

Since servos M–200, M–300 and M–400 each solve Equations $2a$, $3a$ and $5a$ in an analogous manner, a detailed explanation of each circuit is deemed to be unnecessary. For sake of clarity resolvers utilized to derive the sine and cosine potentials are shown schematically as simple potentiometers, but in actual practice comprise conventional resolvers capable of 360 degree resolution. Buffer amplifiers usually utilized in such computer circuits to minimize loading errors have not been shown. Each of the servos shown may comprise any conventional analogue computer servo, and may utilize electrical, hydraulic, or mechanical motive means, and either A.C. or D.C. computation may be utilized. Summing amplifiers shown schematically may comprise the well-known Swartzel summing amplifier circuit or well known series addition circuits may be substituted. It may be noted that servo M–200 provides an output shaft position commensurate with $2\beta$. Those skilled in the art will recognize that the variable anamorphoser may be driven by such a shaft output in accordance with $\beta$ by a 2:1 gear reduction. Each servo may include conventional tachometer generator or other rate feedback for stabilization, and may be equipped in conventional fashion with speed reduction gearing and mechanical limit stops. Those skilled in the art will recognize that in a servo solving a quadratic equation, selection of the proper direction of operation of the servo motive means is necessary for the servo to select the proper root of the quadratic equation. For example, if a conventional two-phase servo-motor is utilized in servo M–100, the polarity connection of the quadrature winding of the motor will determine which root the servo will select. While the position of servo M–300 is determined by the position of servo M–100 (because of the potential from potentiometer R–526), the converse is not true, so that the system can be made stable by conventional technique with minimum difficulty. Servo M–200 orients the variable power anamorphoser with respect to the film or other object, servo M–300 adjusts the variable power spherical lens to the required positions, and servo M–400 provides the required counter-rotation to maintain vanishing point positions of the images coincident regardless of the viewpoint displacement being simulated, all as shown in Fig. 6.

Figure 6:
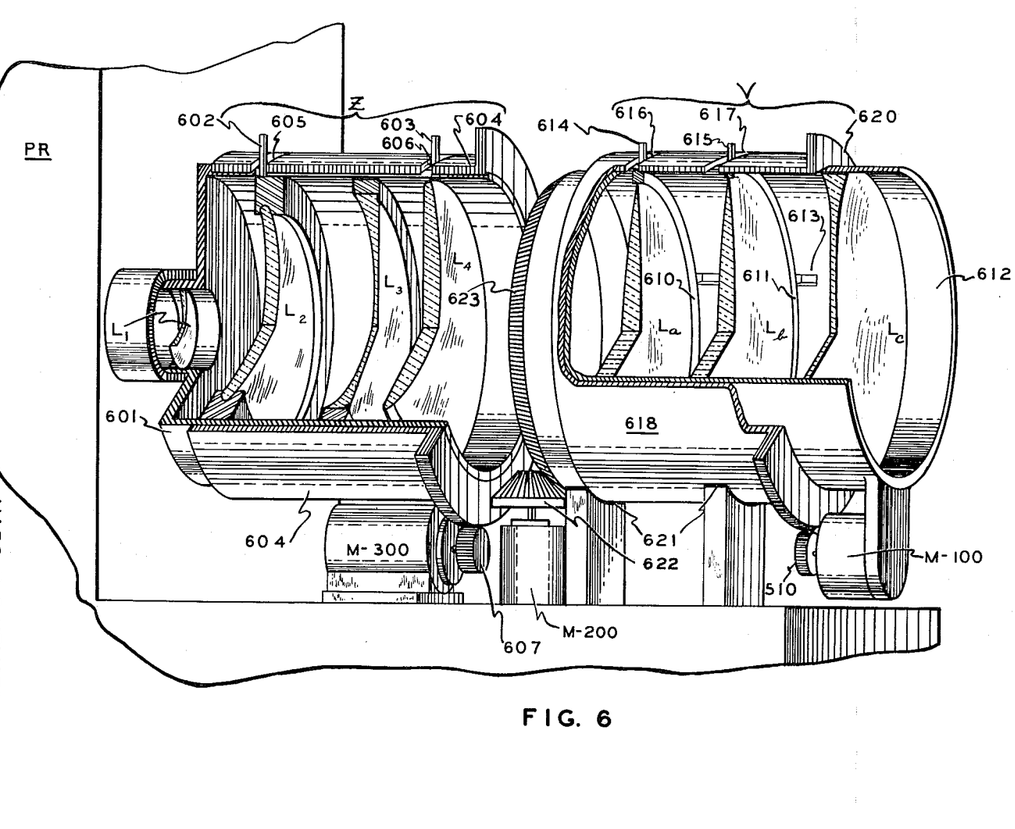
Fig. 6 is a perspective view partially cut away of an exemplary form of optical apparatus constructed in accordance with the invention.

Referring now to Fig. 6 there is shown a projector PR which may comprise, for example, a conventional slide projector or motion picture projector, depending on the nature of the use to be made of the invention. Mounted coaxially with the optical axis of the projector are a variable power spherical lens (indicated generally at Z) and a variable power anamorphoser lens combination (indicated generally at V). If desired, the position of the two units may be interchanged, so that the anamorphoser first acts on the projected images. The variable power spherical lens may comprise, for example, four spherical lens elements axially adjustable one pair to another such as shown in U.S. Patent No. 2,566,485 to Cuvillier, although many other variable effective focal length lenses may be used. Although the Cuvillier unit is shown in Patent 2,566,485 for use on a camera and is afocal, it will be readily apparent to those skilled in the art that it may be used as shown and adapted to focus on a screen placed at a finite distance. The composite lens comprises a paid of lenses $L_2$ and $L_4$ which are axially movable with respect to fixed lenses $L_1$ and $L_3$. Lenses $L_2$ and $L_4$ are slidably mounted in lens barrel 601, and carry pins 602 and 603, which protrude through a longitudinal slot cut in lens barrel 601. Rotatable sleeve 604 surrounds lens barrel 601, and cam slots 605, 606 cut in sleeve 604 accommodate pins 602 and 603. A toothed flange portion of sleeve 604 is engaged by gear 607, so that rotation of servomotor M-300 rotates sleeve 604, axially moving lenses $L_2$ and $L_4$ with respect to lenses $L_1$ and $L_3$. It will be apparent to those skilled in the art that by providing appropriate non-linear slots 605 and 606, the variation in power of "zoom" lens Z may be made linear with respect to rotation of motor M-300. For sake of clarity, potentiometers, tachometer generators, and associated equipment driven by the servomotors has not been shown in Fig. 6.

The variable anamorphoser lens combination shown at V may comprise one of a number of different variable anamorphosers, but is illustrated as comprising a variable power anamorphoser of the type shown and explained in detail in my copending application Serial Number 480,033. Such variable anamorphoser comprises two positive cylindrical lenses $L_a$ and $L_b$ which are axially movable with respect to a fixed negative cylindrical lens $L_c$. Positive lenses $L_a$ and $L_b$ are carried in lens holders 610 and 611 which are slidably carried in lens barrel 612 and axially constrained against rotation by means of keyway 613. Cam pins 614 and 615 attached to lens holders 610 and 611 protrude through a longitudinal slot in lens barrel 612 and are cammed by means of cam slots 616 and 617 cut in rotatable sleeve 618, moving positive lenses $L_a$ and $L_b$ axially with respect to negative lens $L_c$. As shown in Fig. 6, each of the cylindrical lenses has its direction of anamorphic power aligned with the others. Servo motor M-100 rotates gear 510 which meshes with toothed flange 620 of sleeve 618, thereby rotating sleeve 618 about lens barrel 612. In order to orient angularly the variable anamorphoser with respect to the optical axis, the variable anamorphoser is rotatably supported in bearings 621, 621, and $2\beta$ servomotor M-200 positions the anamorphoser by means of bevel gear 622, which meshes with beveled portion 623 of lens barrel 612. Other types of variable anamorphosers which may be utilized are, for example, the "Hi-Lux Val" type of variable anamorphoser which is made by Projection Optics Co. of Rochester, N.Y. and the "Super Panatar" and "Ultra Panator" types of variable anamorphoser, which latter devices are made by Radiant Manufacturing Corporation of Chicago, Illinois.

A cover (not shown) may be placed over the apparatus if desired. Servomotor M-400, which provides the counter-rotation of the distorted image in those systems in which such rotation is necessary, has not been shown in Fig. 6. In embodiments of the invention in which the images are projected upon a fixed screen, servomotor M-400 may be mechanically connected to rotate the object and anamorphoser around the optical axis, or to rotate Dove prisms in such system where a limited angular field is allowable. In systems utilizing a single or only several objects, such objects may be rotated relative to the projector in which they are utilized. In systems using a large number of images (such as motion picture systems), it is deemed preferable to rotate the entire projector about its optical axis in order to avoid mechanical complication of the projector film feed and film storage mechanism. In embodiments of the invention where it is desirable to maintain vanishing point portions of images coincident on a surface as viewpoint displacement is varied, but where the angular orientation of the distorted image with respect to space need not be fixed, servomotor M-400 may be mechanically connected to rotate the surface about the system optical axis. As mentioned above, if vanishing point portions of an image are to remain in one place on the projection surface as the amount of viewpoint displacement is varied, the optical axis of the anamorphoser and the zoom lens should be maintained directed toward the vanishing point portion of the object, or the entire projection apparatus may be angularly rotated to shift the projected image as set forth in detail in my copending application Serial Number 503,211.

Figure 7:
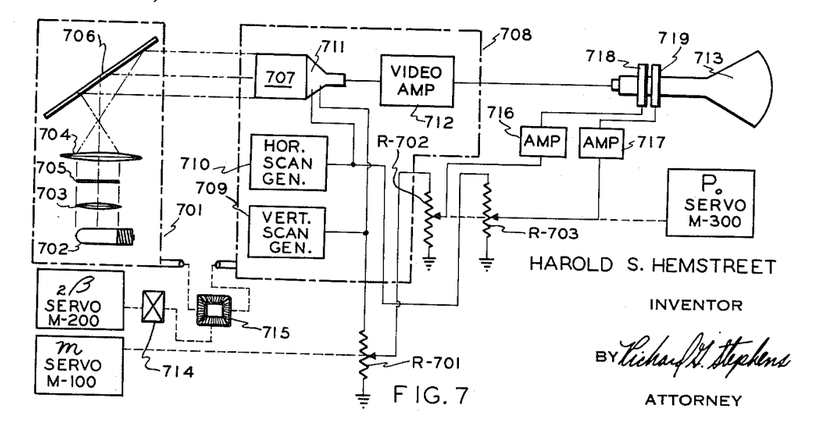
Fig. 7 is an electrical schematic diagram of an exemplary form of electrical apparatus which may be used in practising the invention.

Shown in Fig. 7 is a schematic diagram of an electrical system which may be utilized in practising the invention. A projector indicated within dashed lines at 701 comprises a light source 702, a collimating lens 703, a projection lens 704 and a reflector 706. An image of object 705 is cast upon the face of a conventional television "pickup" or camera tube 707 comprised with video signal generating means indicated generally at 708. Camera tube 707 is provided with conventional horizontal and vertical scanning means 711, which means are actuated in conventional manner by the output potentials of vertical and horizontal scanning generators 709 and 710, respectively. The video signal thereby produced by the camera tube is amplified by video amplifiers indicated generally at 712 and applied between grid and cathode of a conventional projection cathode ray tube 713. Acceleration potentials (not shown) are applied to cathode ray tube 713 in conventional manner. The sawtooth vertical sweep potential output from vertical scanning generator 709 is applied via potentiometers R-701 and R-702, and amplifier 716 to conventional vertical deflection means 718 carried on tube 713. The sawtooth horizontal sweep potential output from horizontal scanning generator 710 is applied via potentiometer R-703 and amplifier 717 to the horizontal deflection means 719 of tube 713. It will be apparent that if like sweep potentials were applied to both camera tube and cathode ray tube, that the picture which will appear on the face of the cathode ray tube would be a substantial duplicate of that projected onto camera tube 707.

However, a relative rotation through the angle $\beta$ is introduced between the projector and the video signal generating means by means of $2\beta$ servo M-200. The output shaft of servo M-200 is applied through reduction gearing 714 to mechanical differential 715, so that the direction of vertical sweep on camera tube 707 is at an angle of $\beta$ with respect to the vertical axis of object 705. Then as the arm of potentiometer R-701 is positioned by servo M-100 in accordance with anamorphic power $m$, the magnitude of the vertical sweep potential applied to vertical deflection means 718 of picture tube 713 is controlled, thereby compressing or expanding the picture on tube 713 in a manner similar to that of the variable anamorphoser. Both horizontal and vertical sweep potentials applied to tube 713 are controlled in magnitude by $P_0$ servo M-300 by means of potentiometers R-703 and R-702, respectively. Since these two potentiometers may be selected so as to expand uniformly or compress uniformly the picture on tube 713, it will be seen that they produce an effect similar to that of a variable power spherical lens. Thus it will be seen that a picture may be produced on the face of projection cathode ray tube 713 similar to that produced by the optical apparatus of Fig. 6. If desired, tube 713 may be rotated to maintain vanishing point portions of an image projected from 713 coincident on a screen regardless of viewpoint displacement. This may be done by rotating the picture tube deflection coils, or the entire picture tube through the angle $(\beta+\rho)$, such as by driving the picture tube from the output of a mechanical differential (not shown) having shaft inputs driven from $2\beta$ servo M-200 and $\rho$ servo M-400. It will be recognized by those skilled in the art that the relative sweep amplitudes between camera tube and picture tube determine picture distortion, and hence in an alternative embodiment of the invention, the picture tube may be driven with sweep potentials of uniform amplitude, and distortion may be accomplished by varying the amplitude of the camera scanning potentials in accordance with desired viewpoint displacement.

As a result of this disclosure it will immediately become apparent to those skilled in the art that a number of known expedients may be utilized in conjunction with the invention. For example, a conventional spherical wide angle attachment may be added to the optical system illustrated in order to provide a larger angular field. The power of such a wide angle attachment will affect the images projected in the same manner as the power of the "zoom" lens shown, and in constructing a computer to control the invention, those skilled in the art will recognize that the wide angle attachment power setting may be "scaled in" as a simple modification of the power or focal length of the zoom lens. Any difference between the projection system focal length and the camera focal length effects the size of the ultimate image, so that the ratio $$\left(\frac{f_c}{f_p}\right)$$

of camera focal length to projector focal length should also be considered as a scale factor in constructing the $P_0$ computer M-300. It will also become apparent to those skilled in the art that an image may be compressed anamorphically a fixed amount in constructing the object and then expanded an equal amount during projection in order to obtain the usual advantages of "Cinemascope" projection. While the invention has been shown as used in conjunction with film images, it will be readily apparent that it may be used with equal facility with images from other transparencies and also with reflected images.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for altering the apparent perspective of an image of an object having the appearance of an area as viewed from a particular viewpoint located at a particular altitude $h_1$ and at a particular position, to provide an image having the appearance of said area as viewed from a selectable second viewpoint located at a different altitude $h_2$ and at a lateral distance $d$ from said particular position, comprising in combination, means for projecting an image of said object along an optical axis onto a surface, an axailly rotatable variable power anamorphoser having an anamorphic magnification proportional to $m$ coaxially disposed along said optical axis, and a variable effective focal length spherical lens system having a magnification proportional to $P_0$, where $$m^2 - m\left[\frac{d^2 + h_1^2 + h_2^2}{h_1 h_2}\right] + 1 = 0$$

and $$P_0{}^2 = \frac{h_2}{h_1 m}$$

2. Apparatus according to claim 1 having means responsive to input adjustments commensurate with the locations of said particular viewpoint and said selectable viewpoint for axially rotating said anamorphoser relative to said object through an angle $\beta$ determinable from the following expression:

$$\tan 2\beta = \frac{-2dh_1}{h_1^2 - h_2^2 - d^2}$$

3. Apparatus according to claim 1 having means responsive to input adjustments commensurate with the locations of said particular viewpoint and said selectable viewpoint for axially rotating said object through an angle $\rho$ determinable from the following expression:

$$\tan \rho = \frac{d}{h_1 + h_2}$$

4. Apparatus for altering the apparent perspective of an image of an object having the appearance of an area as said area would appear when viewed at a first angle from a first viewpoint, thereby to provide a perspectively-correct resultant image having the appearance of said area as it would appear when viewed from a selectable continuously variable viewpoint locatable away from said first viewpoint, comprising in combination, first means for projecting an image of said object along an optical axis onto a viewing surface, second means for providing a controllable primitive transformation of said projected image with respect to said optical axis disposed along said axis, third means for providing a controllable spherical and coaxial magnification of said image disposed along said axis between said first means and said viewing surface, and control means connected to adjust said second and third means simultaneously in accordance with the altitude of said first viewpoint, the selected altitude of said variable-position viewpoint, and the lateral distance between the two recited viewpoints, as the location of said variable viewpoint is varied.

5. Apparatus according to claim 4 in which said second means comprises an axially-rotatable variable power anamorphoser coaxially disposed along said optical axis and in which said third means comprises a variable effective focal length spherical lens system coaxially disposed along said optical axis.

6. Apparatus according to claim 4 having further means for axially rotating said object as the location of said selectable viewpoint is varied, said further means being controlled in accordance with the displacement of said selectable viewpoint from said first viewpoint to rotate said object to maintain horizon line portions of said resultant image in a fixed direction as the power and angle of said primitive transformation is varied and as the power of said spherical coaxial magnification is varied.

7. Apparatus according to claim 5 having means responsive to input adjustments commensurate with the locations of said first viewpoint and said selectable viewpoint, said means being operable to vary simultaneously the power and angular orientation of said anamorphoser and to vary simultaneously the power of said spherical lens system as the location of said selectable viewpoint is varied.

8. Apparatus according to claim 1 which includes a first servomechanism connected to adjust the power of said anamorphoser to a value equal to $m$; a second servomechanism connected to adjust the power of said spherical lens to a value equal to $P_0$; and computer means responsive to input adjustments commensurate with $d$, $h_1$ and $h_2$ for controlling said servomechanisms.

9. Apparatus according to claim 2 which includes a servomechanism connected to adjust the angular orientation of said anamorphoser through the angle $\beta$; and computer means responsive to input adjustments commensurate with $d$, $h_1$ and $h_2$ for controlling said servomechanism.

10. Apparatus according to claim 3 which includes a servomechanism connected to rotate said object axially through the angle $\rho$; and computer means responsive to input adjustments commensurate with $d$, $h_1$ and $h_2$ for controlling said servomechanism.

References Cited in the file of this patent

UNITED STATES PATENTS 886,770   De Zeng _______________ May 5, 1908

(Other references on following page)